United States Patent
Matsui et al.

(10) Patent No.: US 7,012,725 B2
(45) Date of Patent: Mar. 14, 2006

(54) POLYGON MIRROR, DEFLECTING APPARATUS, IMAGE FORMING APPARATUS AND METHOD OF MANUFACTURING THE POLYGON MIRROR

(75) Inventors: Susumu Matsui, Hachioji (JP); Hiroyuki Horiai, Ome (JP); Naohiro Ono, Hino (JP); Hiroshi Miyakoshi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 6 days.

(21) Appl. No.: 10/798,745

(22) Filed: Mar. 10, 2004

(65) Prior Publication Data

US 2004/0246552 A1 Dec. 9, 2004

(30) Foreign Application Priority Data

Jun. 6, 2003 (JP) ............................. 2003-161980

(51) Int. Cl.
*G02B 26/08* (2006.01)
(52) U.S. Cl. ...................................... 359/216; 359/198
(58) Field of Classification Search ........ 359/196–203, 359/212–216, 845, 871, 872, 879, 877, 878, 359/850, 855
See application file for complete search history.

(56) References Cited

U.S. PATENT DOCUMENTS

| | | | | |
|---|---|---|---|---|
| 5,359,460 A | * | 10/1994 | Urakawa | ..................... 359/855 |
| 5,373,391 A | * | 12/1994 | Isobe et al. | ................. 359/216 |
| 5,596,443 A | * | 1/1997 | Konno et al. | ............... 359/200 |
| 5,661,588 A | * | 8/1997 | Ishizuka et al. | ............ 359/216 |
| 5,692,287 A | * | 12/1997 | Nakamura et al. | ............ 29/558 |
| 6,449,000 B1 | * | 9/2002 | Suzuki | ........................ 347/260 |

FOREIGN PATENT DOCUMENTS

| | | |
|---|---|---|
| JP | 2002-048996 A | 2/2002 |
| JP | 2002-048997 A | 2/2002 |

* cited by examiner

*Primary Examiner*—Euncha P. Cherry
*Assistant Examiner*—Pranav Khatri
(74) *Attorney, Agent, or Firm*—Frishauf, Holtz, Goodman & Chick, P.C.

(57) ABSTRACT

There is provided a polygon mirror comprising a mirror body shaped in a regular polygon and having circumferential surfaces, a top surface and a bottom surface, a reflection surface formed on each of the circumferential surface, a machining reference surface provided on one of the top and bottom surfaces, machined to form a mirror surface and used as a reference surface for machining the reflection surface on each of the circumferential surfaces and an assembling reference surface provided on one of the top an bottom surfaces, shaped in parallel to the machining reference surface, machined to form a rough surface and used as a reference surface for assembling the polygon mirror. The polygon mirror has a high degree of reliability in terms of stable optical characteristic when a polygon mirror and a flange member are bonded with each other.

12 Claims, 4 Drawing Sheets

MAIN SCANNING DIRECTION

SUB SCANNING DIRECTION

US 7,012,725 B2

POLYGON MIRROR, DEFLECTING APPARATUS, IMAGE FORMING APPARATUS AND METHOD OF MANUFACTURING THE POLYGON MIRROR

BACKGROUND OF THE INVENTION

This invention relates to:
(1) an image forming apparatus for a multifunctional device such as a digital copying machine, a printer and a facsimile machine or a multifunctional device having the functions thereof, or
(2) a deflecting apparatus used in a barcode reader or the like,
(3) an image forming apparatus equipped with the aforementioned deflecting apparatus, and
(4) a method for manufacturing the deflecting apparatus.

DESCRIPTION OF RELATED ART

In an image forming apparatus, a laser beam including information having been read out, is applied to a polygon mirror rotating at a high speed in a deflecting apparatus, and its reflected light is reflected onto photosensitive material by scanning, whereby an image recording is performed. A deflecting apparatus using such a polygon mirror is disclosed in many Official Gazettes of Patents. The deflecting apparatus shown in FIG. 6 is one example of such an apparatus. (See Patent Document 1, for reference).

The following describes a deflecting apparatus disclosed in Patent Document 1, with reference to FIG. 6 and FIG. 7, a perspective view where the polygon mirror is viewed from the bottom of FIG. 6:

Polygon mirror 72 is equipped with reflecting surface 72a, which deflects laser beams by reflecting them, on the outer circumference surface, and is formed in a regular polygon. The polygon mirror 72 is inserted into flange member 71 integrated with external cylinder bearing 73 and is bonded with the flange member 71 by means of an assembling reference surface 72b. Polygon mirror 72 is integrally held by flange member 71 and forms a mirror unit 70. In the meantime, an inner tube bearing 65 fitting with the external cylinder bearing 73 in the radial direction, an upper thrust bearing 66 abutting the external cylinder bearing 73 in the thrust direction, and lower thrust bearing 64 are inserted into base member 60, and clamping plate 67 is clamped onto the base member 60 by machine screw 68, whereby the mirror unit 70 is positioned in the thrust direction. Further, the base member 60 is fixed with fixing yoke 61 and printed circuit board 63 provided with magnet coil 62. In the meantime, the flange member 71 is fixed with magnet 77 positioned face-to-face with magnet coil 62.

Because of the aforementioned arrangement, when power is applied to the magnet coil 62, the mirror unit 70 is rotated at a high speed with respect to the base member 60 by interaction with the magnet 77 through each bearing.

Patent Document 2 discloses a deflecting apparatus wherein a polygon mirror is pressed against a flange member by a plate spring and is fixed in a position, without bonding the polygon mirror onto the flange member.

However, when the polygon mirror is bonded to the flange material, as shown in Patent Document 1, without using a plate spring, the number of parts can be reduced and compact configuration of the deflecting apparatus can be realized with less expensive method.

Patent Document 1:
Official Gazette of Japanese Application Patent Laid-Open Publication No. 2002-48996
Patent Document 2
Official Gazette of Japanese Application Patent Laid-Open Publication No. 2002-48997

The assembling reference surface 72b of the polygon mirror 72 also serves as a processing or machining reference surface for machining the reflecting surface 72a so as to form a right angle with the assembling reference surface 72b. Therefore, the assembling reference surface 72b is finished to a surface roughness similar to that of a mirror finish (0.06 μm or less in terms of arithmetic mean roughness Ra specified in the JIS B0601 or ISO 468-1982). The holding surface 71a of the flange member 71 for holding the polygon mirror 72 is also finished to a high accuracy with a right angle to the rotary axis of the external cylinder bearing 73. As described above, the assembling reference surface 72b of the polygon mirror 72 is butted and adhered to the holding surface 71a of the flange member 71.

In the meantime, when the deflecting apparatus is used, the polygon mirror 72 rotates at a high speed; therefore, the temperature of the deflecting apparatus rises to 60 through 70° C., and then gets back to normal temperature when it is not used. Since such a temperature change occurs and there is a difference in the shrinkage rate between a polygon mirror 72 and a flange member 71, there may be separation of adhesion between assembling reference surface 72b of polygon mirror 72 and holding surface 71a of flange member 71.

In view of prior art described above, present invention has been made. An objective of this invention is to provide a polygon mirror, a deflecting apparatus, an image forming apparatus, and a polygon mirror manufacturing method, wherein aforementioned polygon mirror is characterized by a high degree of reliability; when a polygon mirror is adhered to a flange member, they are not easily separated when exposed to a change in temperature etc, and stable optical characteristics (tilt angle of the reflected surface) of the polygon can be guaranteed.

SUMMARY OF THE INVENTION

The aforementioned objective can be achieved by any of the following means:
(1) A polygon mirror, formed in a regular polygon and having a reflecting surface on each circumference surface, comprising:
a machining reference surface having been planished to serve as a reference surface for working the reflected surface; and
an assembling reference surface arranged parallel to the aforementioned machining reference surface and subjected to roughened surface to serve as a reference surface for polygon assembling.
(2) A deflecting apparatus comprising:
a base member;
a polygon mirror formed in a regular polygon and having a reflecting surface on each circumference surface; and
a flange member for holding the aforementioned polygon and rotating with respect to the aforementioned base member;
wherein the polygon mirror further contains a machining reference surface, planished to serve as a machining reference surface for planishing the reflecting surface, and an assembling reference surface arranged parallel to the aforementioned machining reference surface and subjected to a roughed surface to serve as a reference surface for polygon assembling; and the assembling reference surface is butted and bonded to the flange member.

(3) An image forming apparatus comprising a deflecting apparatus described in (2).

(4) A method for producing a polygon mirror comprising the steps of means for fixing a first end surface of roughly processed polygon mirror material shaped in polygon, onto a processing machine;

means for forming a machining reference surface by planishing a second end surface located in back side of the first end surface;

means for forming an assembling reference surface for assembly of polygon mirror by roughly finishing a surface different from the second end surface in parallel with the machining reference surface and being dented in the direction of the rotation axis of the polygon mirror;

means for planishing the first end surface so that the first end surface is parallel with the machining reference surface by fixing the machining reference surface onto machine; and means for planishing each circumferential surface of the reflection surface by stacking a plural of material processed in the steps above, along rotational axis direction of the polygon mirror.

DETAIL DESCRIPTION OF THE INVENTION

Figure 1:
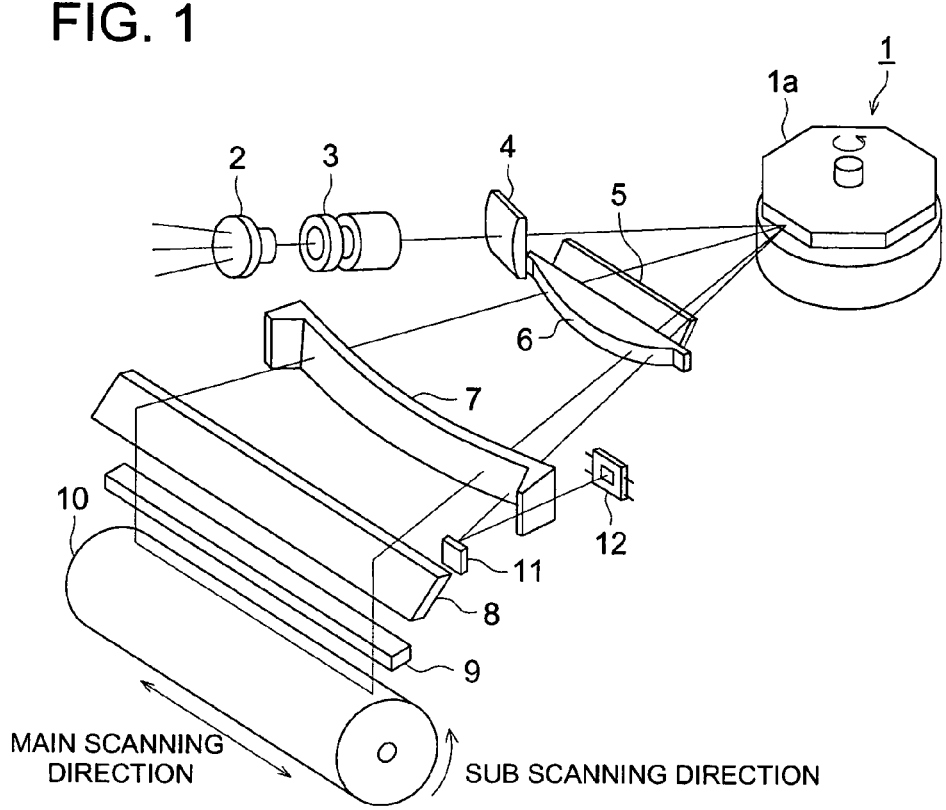
FIG. 1 is a perspective view representing a beam scanning optical apparatus equipped with a deflecting apparatus.

The following describes an embodiment of a beam scanning optical apparatus having a deflecting apparatus with reference to FIG. 1:

In FIG. 1, numeral 1 denotes a deflecting apparatus equipped with a polygon mirror 1a, 2, a semiconductor laser, 3 a collimator lens for beam shaping optical system, 4, a first cylindrical lens, 5 and 6, fθ lenses, 7, a second cylindrical lens, 8, a mirror, 9, a cover glass, and 10, a photosensitive material drum. Numeral 11, shows an index mirror for synchronization detection, and 12, an index sensor for synchronization detection.

Laser beams emitted from semiconductor laser 2 is converted into parallel beams by collimator lens 3, passed through a first cylindrical lens 4 of a first image formation optical system and guided to a reflecting surface of polygon mirror 1a which rotates at a constant high-speed in deflecting apparatus 1. Laser beams reflected by the reflecting surface of polygon mirror 1a pass through a second image formation optical system comprising fθ lenses 5 and 6 and second cylindrical lens 7, and main scanning is carried out with a pre-determined laser beam spot size on the circumference surface of photosensitive material drum 10. Direction of main scanning is finely adjusted by an adjusting mechanism (not illustrated), and synchronization detection for each line is performed prior to starting of scanning by guiding the laser beams into index sensor 12 through index mirror 11.

To get a satisfactory latent image on photosensitive material drum 10, such a beam scanning optical apparatus is required to ensure that polygon mirror 1a is formed in a regular polygon, a plurality of high-precision reflecting surfaces are provided, and high-speed rotation is enabled without any tilt with respect to axis of rotation and displacement with respect to rotation axis of photosensitive material drum 10.

Figure 2:
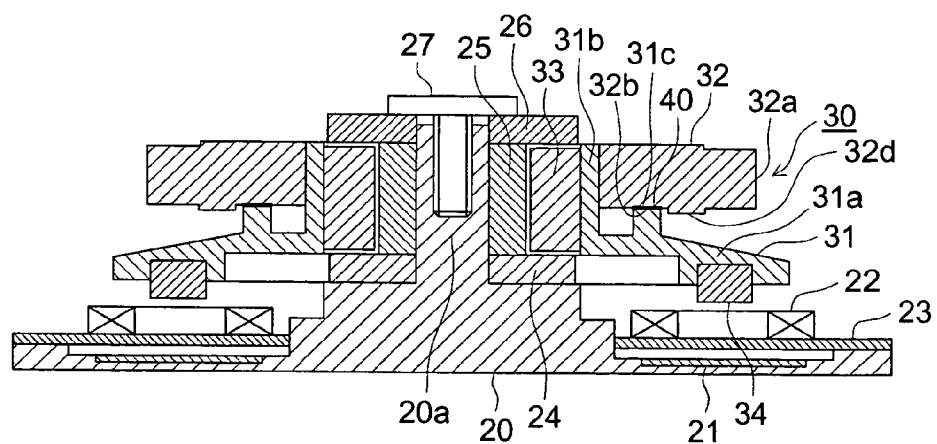
FIG. 2 is a vertical sectional view representing a deflecting apparatus.
Figure 3:
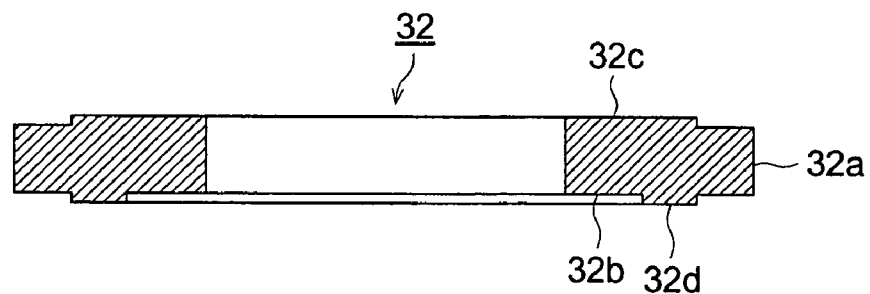
FIG. 3 is a sectional view of a polygon mirror.
Figure 4:
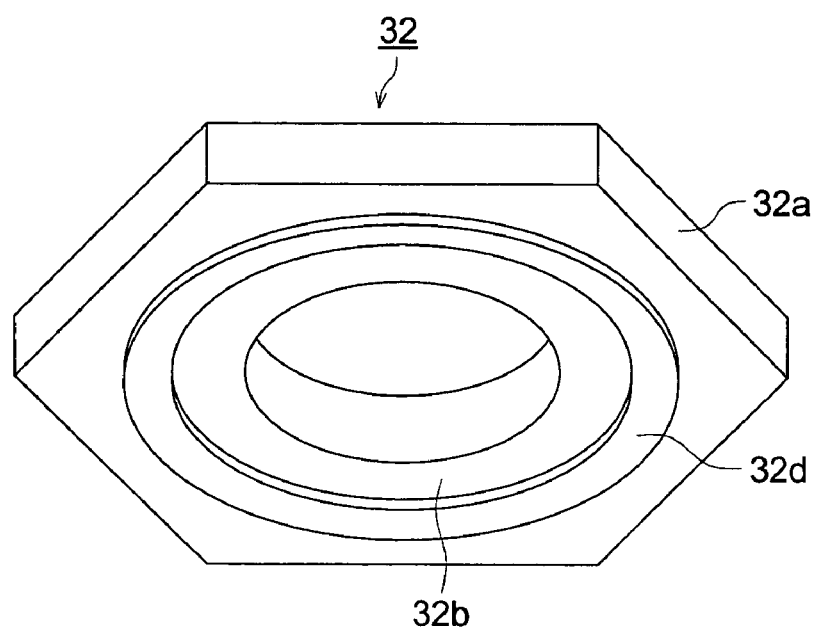
FIG. 4 is a perspective view representing the polygon mirror as viewed from the bottom.

The following describes a deflecting apparatus mounted on the aforementioned beam scanning optical apparatus and the polygon mirror with reference to FIGS. 2 through 4: FIG. 2 is a vertical sectional view representing a deflecting apparatus. FIG. 3 is a sectional view of a polygon mirror, and FIG. 4 is a perspective view representing the polygon mirror as viewed from the bottom.

In FIG. 2, numeral 20 denotes a base member, which is made of a metal such as aluminum. It holds various members to be described later, and is secured on the aforementioned beam scanning optical apparatus. A fixing yoke 21 is secured on the upper surface of the base member 20. A printed circuit board 23 with a plurality of magnetic coils 22 mounted thereon is also secured in position.

Holding surface 31c for holding polygon mirror 32 is arranged on the top surface of flange 31a. External cylinder bearing 33 is inserted integrally into a hole provided at the center of the cylindrical portion 31b in flange member 31 by shrinkage fitting or inserting under pressure.

The flange member 31 and bearing 33 may be formed integrally with each other.

The polygon mirror 32 is formed in a high-precision regular polygon by metal such as aluminum, and is provided with reflecting surface 32a for reflecting and deflecting laser beams on an outer circumference surface of polygon mirror 32. This polygon mirror 32 is inserted into the outer peripheral portion of the cylindrical portion 31b in the flange member 31, and assembling reference surface 32b of the polygon mirror 32 is butted on the holding surface 31c and is adhered by adhesive agent 40. The holding surface 31c of the flange member 31 is perpendicular to a rotation axis of and is finished with mirror surface quality. As will be described later, the assembling reference surface 32b of the polygon mirror 32 is subjected to a roughened surface; therefore, the adhesive agent 40 spreads into the recesses of the rough surface. The assembling reference surface 32b is firmly secured on the holding surface 31c. Therefore, even if there is a change in temperature, the polygon mirror 32 is not easily separated from the flange member 31.

As will be described later, the polygon mirror 32 has machining reference surface 32d as a reference for working reflecting surface 32a, separately from assembling reference surface 32b as a reference for assembling. Since the machining reference surface 32d and assembling reference surface 32b are formed in parallel to each other, the tilt angle of the reflecting surface 32a can be maintained at an appropriate level when the polygon mirror 32 is bonded to the flange member 31.

Permanent magnet 34 located opposite to magnet coil 22, for generating rotary torque, is bonded on the bottom of the flange member 31 by adhesive agent.

As described above, mirror unit 30 is comprised of flange member 31, polygon mirror 32 external cylinder bearing 33 and permanent magnet 34.

A shaft 20*a* is arranged upright at the center of base member 20. A lower thrust bearing 24 is fitted to shaft 20*a*, and internal cylindrical bearing 25 is also fitted therein. This is followed by the step of fitting external cylinder bearing 33 of mirror unit 30 into internal cylindrical bearing 25. An upper thrust bearing 26 is fitted to the shaft 20*a* and is secured by screwing machine screw 27 into shaft 20*a*. The internal cylindrical bearing 25, external cylinder bearing 33, lower thrust bearing 24 and upper thrust bearing 26 are composed of alumina and ceramics such as silicon nitride.

As described above, in the external cylinder bearing 33 holding the mirror unit 30, the radial bearing is formed by the internal cylindrical bearing 25, and radial dynamic rotation is performed. A thrust bearing is constituted by the lower thrust bearing 24 and upper thrust bearing 26, whereby thrust dynamic rotation is formed. Dynamic pressure generating groove is formed with at least one of the bearing surface of the lower thrust bearing 24, bearing surface of the upper thrust bearing 26 or the outer circumference surface of the internal cylindrical bearing 25. Thus, wind produced by high-speed rotation enters the dynamic pressure generating groove, and a gap of about 3 through 10 $\mu$m is produced between each of the fixed bearings and the external cylinder bearing 33 by heavy wind pressure generated from the dynamic pressure generating groove, with the results that resistance between them will be reduced. Thus, the mirror unit 30 comes to a non-contact state, resulting in a smooth and high-speed rotation.

In the manner described above, the deflecting apparatus is formed. Since the mirror unit 30 makes a high-speed rotation, there will be a wind noise offensive to the ears due to disturbance of airflow or noise due to vibration. Especially in the office where quiet atmosphere is required, noise preventive measures must be taken. To solve this problem, it is preferred to provide a cover opposite to the base member 20, thereby protecting the mirror unit 30 or the like.

Figure 5A:
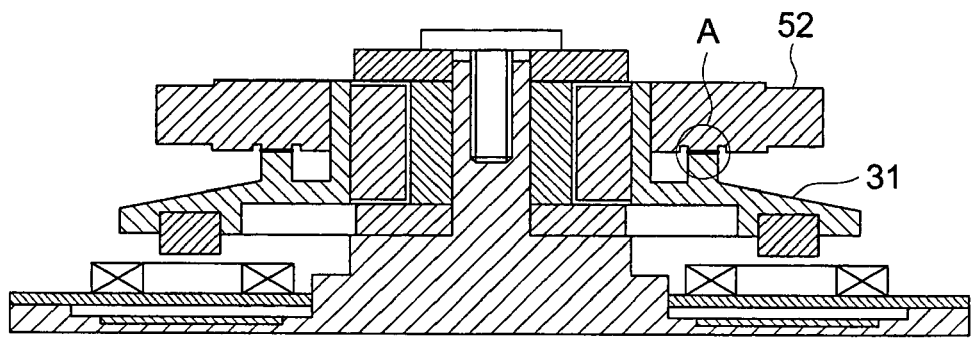
FIGS. 5(a) and 5(b) are vertical cross sectional views of the deflecting apparatus, with an enlarged view.
Figure 5B:
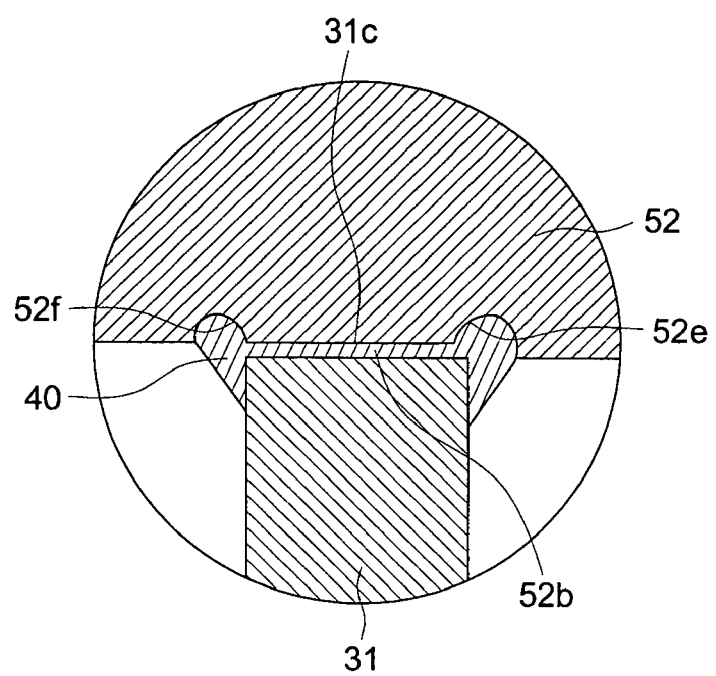
Figure 6:
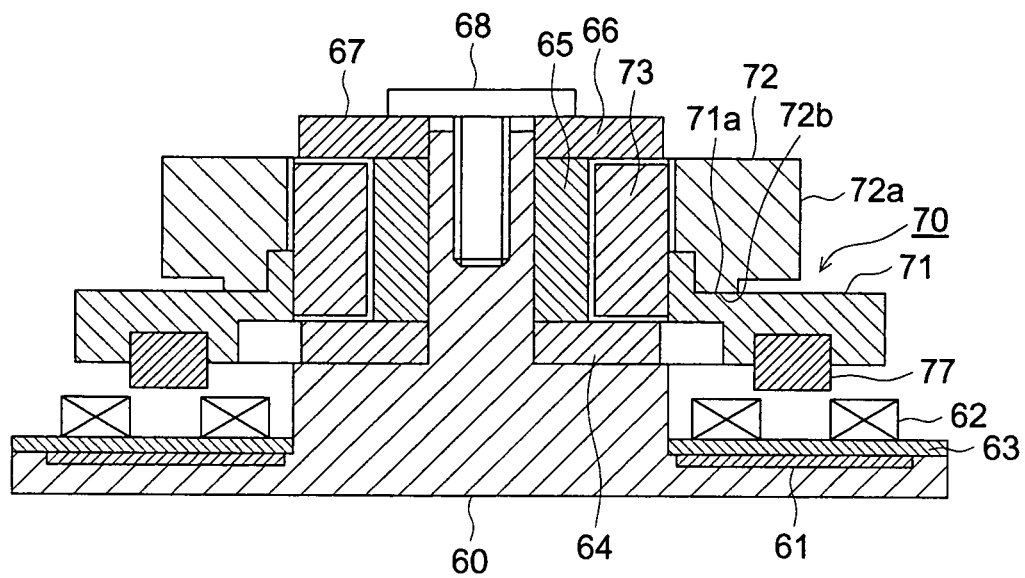
FIG. 6 is a vertical cross sectional view of a prior art deflecting apparatus.
Figure 7:
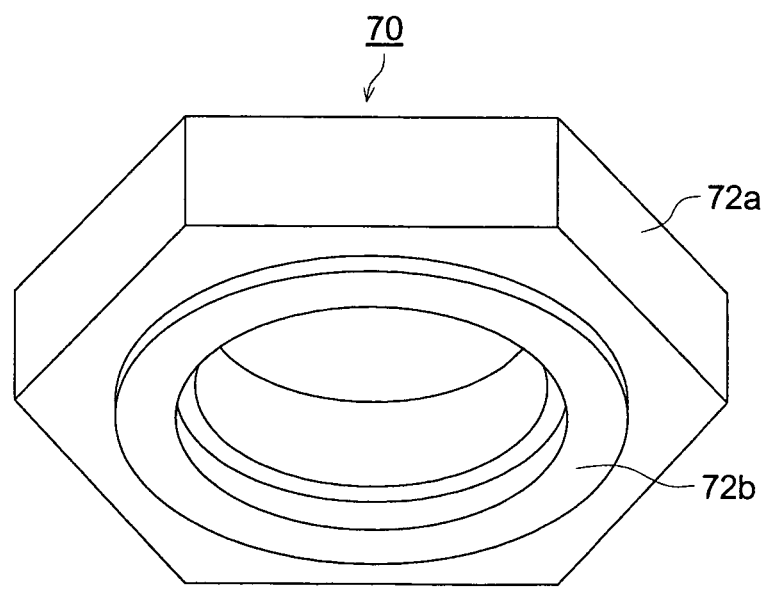
FIG. 7 is a perspective view representing the prior art polygon mirror as viewed from the bottom.

It is also possible to provide a cover disclosed in the Official Gazette of Japanese Patent Laid-Open No. 1999-84296. To ensure firm bonding of the polygon mirror to the flange member, the polygon mirror can be formed as shown in FIG. 5. FIG. 5(*a*) is a vertical cross sectional view of the same deflecting apparatus as that of FIG. 2. FIG. 5(*b*) is an enlarged view of the section A given in FIG. 5(*a*).

In the polygon mirror 52 of FIG. 5, ring-shaped slits 52*e* and 52*f* are formed along the outer and inner circumference of assembling reference surface 52*b*. Therefore, the adhesive agent 40 for bonding the holding surface 31*c* between the assembling reference surface 52*b* and flange member 31 spreads into the slits 52*e* and 52*f*, with the result that the flange member 31 is firmly held in position by the polygon mirror 52.

The slits 52*e* and 52*f* need not always be formed along both the outer and inner circumference of the assembling reference surface 52*b*. It can be formed along either the outer or inner circumference.

The following describes the method of producing polygon mirror 32 with reference to FIGS. 3 and 0.4:

(1) A first end surface 32*c* of polygon mirror material formed on a regular polygon is mounted on the polygon mirror-working machine.

(2) A second end surface located on the back of the first end surface 32*c* is planished by cutting operation and is formed into a machining reference surface 32*d*.

(3) A surface different from the machining reference surface 32*d* on the second end surface is formed by a polycrystalline diamond cutting tool in such a way that it will be in parallel with the machining reference surface 32*d*, and will be dented by several tens of micron meters with respect to the machining reference surface 32*d* in the direction of the rotation axis, thereby forming a assembling reference surface 32*b* so that the surface roughness will be 0.16 $\mu$m or more, but not more than 21.8 $\mu$m in terms of arithmetic mean roughness Ra.

The aforementioned arithmetic mean roughness Ra is specified in the JIS B0601 or ISO 468-1982.

(4) The material having been worked in the aforementioned steps is removed from the machine and the machining reference surface 32*d* is mounted on the machine, contrary to the aforementioned description. The first end surface 32*c* is planished so that it will be parallel to the machining reference surface 32*d*.

(5) A plurality of materials machined in the above steps are loaded, and the reflecting surface 32*a* on each circumference surface is planished so that it will be perpendicular to machining reference surface 32*d*, whereby the production of the polygon mirror 32 is completed.

In the aforementioned working procedures, the machining reference surface 32*d* and assembling reference surface 32*b* are positioned to the second end surface on the same side. They can be positioned to different end surfaces.

In the above step, machining operations are made in such a way that the surface roughness of the assembling reference surface 32*b* will be 0.16 $\mu$m or more, but not more than 21.8 $\mu$m in terms of arithmetic mean roughness Ra. The reason for this step will be described with reference to Table 1.

TABLE 1

| Surface roughness of working reference surface ($\mu$m) | Polygon mirror separation strength (N) | |
|---|---|---|
| | Before heat shock test | After heat shock test |
| 0.09 | 4.16 | 2.21 |
| 0.16 | 4.31 | 3.83 |
| 0.62 | 4.03 | 3.72 |
| 1.21 | 4.34 | 3.91 |
| 5.35 | 4.07 | 4.19 |
| 12.2 | 4.24 | 3.97 |
| 21.8 | 3.95 | 3.91 |
| 25.1 | 3.31 | 2.67 |

The surface roughness of assembling reference surface 32*b* was changed according to a cutting tool feed rate, the amount of in-feed and the speed of the lathe to produce ten polygon mirrors 32 having different surface roughness. The THREE BOND 2204 (R) as a one-part epoxy adhesive was used to bond the assembling reference surface 32*b* to the holding surface 31*c* of the flange member 31. This was followed by the step of heat shock tests (50 cycles, at −30 through +75 degrees Celsius maintained for one hour). Then the separation strength of polygon mirror 32 (N) was measured before and after the heat shock test.

The aforementioned has revealed that, when the surface roughness of assembling reference surface 32*b* is 0.09 $\mu$m in terms of arithmetic mean roughness Ra, the separation strength after heat shock test exhibits a substantial reduction. When the surface roughness of the assembling reference surface 32*b* is 25.1 $\mu$m in terms of arithmetic mean roughness Ra, the separation strength before and after heat shock test is small. It is estimated that this excessive surface roughness causes bubbles to enter the bonded surface. Thus, the best separation strength is ensured when the surface roughness of the assembling reference surface 32*b* will be 0.16 μm or more, but not more than 21.8 μm, preferably 0.2 μm or more, but not more than 20 μm in terms of arithmetic mean roughness Ra.

In a polygon mirror, a deflecting apparatus, an image forming apparatus and a polygon mirror manufacturing method of the present invention, the polygon mirror has a machining reference surface as a reference for working the reflecting surface, apart from the assembling reference surface as a reference for assembling, so that they are parallel to each other. The machining reference surface is planished and the assembling reference surface is subjected to surface roughing. Thus, the reflecting surface is processed to a high precision, and when the polygon mirror is bonded with the flange member in order to assemble the polygon mirror, the adhesive is allowed to spread into the dents of the rough surface on the polygon mirror assembled reference surface; therefor, the assembled reference surface is firmly secured on the holding surface of the flange member. Thus, the polygon mirror and flange member is not easily disconnected when there is a change in temperature. The advantage of this effect of the present invention is further promoted by the high reliability where stable optical characteristics (tilt angle of the reflected surface) the polygon are ensured.

What is claimed is:

1. A polygon mirror which is bonded to a connection member that connects the polygon mirror to a bearing to support the polygon mirror about an axis of rotation thereof, said polygon mirror comprising:
   a mirror body which is shaped as a regular polygon and includes circumferential surfaces, a top surface and a bottom surface, and which comprises a reflection surface formed on each of the circumferential surfaces;
   a machining reference surface which is provided on one of the top and bottom surfaces, and which is machined to have a mirror surface and is used as a reference surface for machining the reflection surface on each of the circumferential surfaces; and
   an assembling reference surface which is provided on one of the top and bottom surfaces and is parallel to the machining reference surface, and which is machined to have a rougher surface than the machining reference surface;
   wherein the assembling reference surface is used as a reference surface for bonding the polygon mirror to the connection member with an adhesive.

2. A polygon mirror of claim 1, wherein a surface roughness Ra of said assembling reference surface is determined by the formula:

$$0.16\ \mu m \leq Ra < 21.8\ \mu m,$$

wherein said surface roughness Ra is an arithmetic mean roughness specified in the JIS B0601 or ISO 468-1982.

3. A polygon mirror of claim 1, wherein a surface roughness Ra of said assembling reference surface is determined by the formula $$0.2\ \mu m \leq Ra \leq 20\ \mu m,$$

wherein said surface roughness Ra is an arithmetic mean roughness specified in the JIS B0601 or ISO 468-1982.

4. A polygon mirror of any one of claims 1–3, wherein a circular groove is provided along at least one of an inside and an outside edge of said assembling reference surface.

5. A deflecting apparatus comprising:
   a base member;
   a polygon mirror shaped as a regular polygon;
   a bearing rotatably mounted against the base member; and
   a connection member which holds said polygon mirror and connects the polygon mirror to the bearing, and which is connected to the bearing to be rotatably mounted with the bearing about said base member;
   wherein said polygon mirror comprises:
      a reflection surface formed on each circumferential surface thereof;
      a planished machining reference surface used as a reference surface for machining when machining said reflection surfaces; and
      an assembling reference surface, which is rougher than and parallel to the machining reference surface, and which is used as a reference surface for assembling said polygon mirror;
   wherein said assembling reference surface is abutted against and bonded onto said connection member with an adhesive.

6. A deflecting apparatus of claim 5, wherein a surface roughness Ra of said assembling reference surface is determined by the formula:

$$0.16\ \mu m \leq Ra \leq 21.8\ \mu m,$$

wherein said surface roughness Ra is an arithmetic mean roughness specified in the JIS B0601 or ISO 468-1982.

7. A deflecting apparatus of claim 5, wherein a surface roughness Ra of said assembling reference surface is determined by the formula $$0.2\ \mu m \leq Ra \leq 20\ \mu m,$$

wherein said surface roughness Ra is an arithmetic mean roughness specified in the JIS B0601 or ISO 468-1982.

8. A polygon mirror of any one of claims 5–7, wherein a circular groove is provided along at least one of an inside and an outside edge of said assembling reference surface.

9. An image forming apparatus equipped with the optical deflecting apparatus of any one of claims 5–7.

10. An image forming apparatus equipped with the optical deflecting apparatus of claim 8.

11. A polygon mirror of claim 1, wherein the connection member transfers rotation torque to the polygon mirror.

12. A deflecting apparatus of claim 5, wherein the connection member transfers rotation torque to the polygon mirror.

* * * * *